United States Patent Office

2,701,248
Patented Feb. 1, 1955

2,701,248

ESTERS OF PSEUDOTHIOHYDANTOIN-5-ACETIC ACID AND METHOD FOR THEIR PREPARATION

Ferdinand B. Zienty, Brentwood, Mo., assignor to Monsanto Chemical Company, St. Louis, Mo., a corporation of Delaware No Drawing. Application December 30, 1950, Serial No. 203,795

6 Claims. (Cl. 260—306.7)

This invention relates to new chemical compounds and to a process for preparing the same. More particularly, the invention relates to esters of pseudothiohydantoin-5-acetic acid.

The compounds of the present invention may be represented by the following formula:

$$R-O-\overset{O}{\overset{\|}{C}}-\overset{R_1}{\overset{|}{CH}}-\overset{R_2}{\overset{|}{C}}-S$$
$$O=C\diagdown\diagup C=NH$$
$$\underset{H}{N}$$

wherein R represents an organic radical, e. g., aliphatic radicals, alicyclic radicals, heterocyclic radicals and aromatic radicals; $R_1$ and $R_2$ represent hydrogen or methyl. Such radicals may be unsubstituted or substituted with such groups as amino, nitro, oxy, halo, e. g., chloro, bromo, etc., groups and the like.

As examples of esters of pseudothiohydantoin-5-acetic acid having the above-mentioned general formula are aliphatic esters, e. g., the alkyl esters such as the methyl, ethyl, propyl, isopropyl, 2-ethylhexyl, isoamyl, aminoethyl, nitropropyl, chloroethyl, etc.; alkoxyalkyl esters, for example, methoxyethyl, propoxyethyl, butoxyethyl, methoxypropyl, aminoethoxyethyl, nitroethoxyethyl, chlorobutoxyethyl, etc.; the alkenyl esters such as vinyl, allyl, propenyl, butenyl, etc.; the cycloalkyl esters, such as cyclobutyl, cyclopentyl, cyclohexyl, methyl cyclohexyl, cycloheptyl; substituted cycloalkyl esters, such as chlorocyclobutyl, nitrocyclopentyl, aminoethyl cyclohexyl and the like; the aromatic esters, for example, phenethyl, phenylhexyl, benzyl, chlorophenethyl, aminophenylhexyl, etc.; nitrophenyl, aminotolyl, etc.; the heterocyclic esters, such as furfuryl, tetrahydrofurfuryl, thenyl, chlorothenyl, nitrothenyl, etc.; methylmercaptoethyl, and the like.

According to the present invention, these new esters of the invention are readily obtained by reaction of thiourea with the corresponding mono-esters of an acid having the formula $$HOOC-CR_1=CR_2-COOH$$

wherein $R_1$ and $R_2$ are each selected from the group consisting of hydrogen and the methyl radical, i. e., maleic, fumaric, citraconic, mesaconic, dimethyl maleic and dimethyl fumaric acids.

The maleic, citraconic or dimethyl maleic monoesters employed in forming the corresponding esters of pseudothiohydantoin-5-acetic acid according to the process of the invention may be prepared by the partial esterification of the maleic, citraconic or dimethyl maleic acid with the appropriate alcohol, by reaction of the anhydride of one of the foregoing acids with the appropriate alcohol or by partial hydrolysis of the corresponding diesters.

The fumaric and mesaconic monoesters may be obtained by hydrolysis of the corresponding diesters or by the partial esterification of fumaric or mesaconic acid with the appropriate alcohol.

The following examples are illustrative of the present invention but are not to be construed as limitative thereof. Where parts are mentioned, they are parts by weight.

Example I

To 87 parts of butyl hydrogen maleate are added 38 parts of thiourea and 100 parts of butanol with stirring and the mixture refluxed for about five hours. The resulting reaction mixture is cooled to room temperature, allowed to stand for about twelve hours, and then filtered. The filtrate is washed with water and the excess alcohol and water removed by distillation under reduced pressure. Further distillation yields 83 parts of a material which is solid at room temperature and is identified as butyl pseudothiohydantoin-5-acetate. The yield is 72% of theory based on the thiourea charged.

Example II

To a mixture of 78 parts of tetradecyl hydrogen maleate and 100 parts of toluene are added 15.2 parts of thiourea and the reaction mixture refluxed for four hours.

The resulting mixture is allowed to stand at room temperature for approximately twenty-four hours and the resulting solid precipitate consisting essentially of pseudothiohydantoin-5-acetic acid is removed by filtration. The filtrate is washed with water and the excess toluene and water distilled off under reduced pressure. Further distillation yields 15.7 parts of tetradecyl pseudothiohydantoin-5-acetate corresponding to a 53% yield based on the thiourea consumed. A portion of the product recrystallized from a mixture of ethanol and water, melts at 65°–66° C.

Example III

A mixture containing 35.2 parts of 9-octadecenyl hydrogen maleate, 50 parts of anhydrous benzene and 7.6 parts of thiourea is placed in a reaction vessel and heated under reflux conditions for four hours.

The resulting reaction mixture is allowed to stand for approximately twenty-four hours, filtered to remove the precipitated pseudothiohydantoin-5-acetic acid, and the filtrate washed with benzene. After distilling off the benzene, further distillation yields 5.9 parts of 9-octadecenyl pseudothiohydantoin-5-acetate, corresponding to a yield of 22.5% based on the thiourea charged.

Example IV

To a mixture of 228.2 parts of 2-ethylhexyl hydrogen maleate and 200 parts of 2-ethylhexanol are added 76 parts of thiourea. After three hours' refluxing, the resulting product is cooled and filtered to remove the precipitated pseudothiohydantoin-5-acetic acid. The filtrate is washed with 2-ethylhexanol and the excess alcohol is then removed by distillation. Further distillation yields 224.5 parts of 2-ethylhexyl pseudothiohydantoin-5-acetate, corresponding to a yield of 78% based on the thiourea employed.

Example V 198 parts of cyclohexyl hydrogen maleate, 150 parts of cyclohexanol and 76 parts of thiourea are heated at reflux for three hours. The reaction mixture is then cooled and filtered. The filtrate is washed with cyclohexanol and the excess alcohol removed by distillation. Further distillation yields cyclohexyl pseudothiohydantoin-5-acetate. The product in the pure form in which it is obtained consists of yellowish crystals. The yield, based on the thiourea charged, is about 75% of the theoretical.

Example VI

A mixture containing 20 parts of tetrahydrofurfuryl hydrogen maleate, 75 parts of tetrahydrofurfuryl alcohol and 7.6 parts of thiourea is treated as in Example II. A good yield of tetrahydrofurfuryl pseudothiohydantoin-5-acetate is obtained.

Example VII

A mixture of 106.1 parts of 2-thenyl hydrogen maleate, 200 parts of thenyl alcohol and 38 parts of thiourea is refluxed on a water bath for six hours. The reaction product is cooled, filtered and distilled as described in Example II. 2-thenyl pseudothiohydantoin-5-acetate is obtained in excellent yield.

Example VIII

Using the procedure set forth in Example II, 46.8 parts of allyl hydrogen maleate, 100 parts of ethanol and 22.8 parts of thiourea are reacted. After recovery as in Example II, the product is identified as allyl pseudothiohydantoin-5-acetate.

Example IX

A mixture of 98.1 parts of 2-butoxyethyl hydrogen fumarate, 200 parts of ethanol and 38 parts of thiourea are reacted at 125° C. for three hours. The resulting product is allowed to cool and stand for approximately twenty-four hours. The excess alcohol is removed by distillation. The product recovered after further distillation is identified as 2-butoxyethyl pseudothiohydantoin-5-acetate.

Example X

To a mixture of 81.6 parts of 2-(ethylmercapto) ethyl hydrogen maleate and 100 parts of ethanol, 30.4 parts of thiourea are added and the mixture heated under reflux for six hours. The resulting product is treated as in Example II to obtain a good yield of 2-(ethylmercapto) ethyl pseudothiohydantoin-5-acetate.

Example XI

A mixture of 158.2 parts of methyl hydrogen dimethyl maleate, 200 parts of toluene and 76 parts of thiourea is refluxed on a water bath for seven hours. The reaction product is cooled, filtered and distilled as described in Example II. An excellent yield of methyl $\alpha$,5-dimethyl-pseudothiohydantoin-5-acetate is obtained.

Example XII

A mixture of 110 parts of phenethyl hydrogen maleate, 250 parts of anhydrous benzene and 38 parts of thiourea is refluxed on a water bath for seven hours. The resulting reaction product is cooled, filtered and the filtrate treated as described in Example II. A good yield of phenethyl pseudothiohydantoin-5-acetate is obtained.

The monoalkyl, monoalkenyl, monocycloalkyl, monoalkoxyalkyl, monoaralkyl, etc., esters of the unsaturated aliphatic dicarboxylic acids used in preparing the novel esters of the present invention may be prepared by reacting the corresponding alcohol with the acid, by forming the diester of the acid and then subjecting it to partial hydrolysis; or in the case of maleic, dimethylmaleic and citraconic acids, by reacting the anhydride with the appropriate alcohol. The resulting monoester may be recovered by any suitable means, for example, by stripping off any excess alcohol, thereafter cooling and washing the residue and treating with alkali to remove any diester followed by acidification of the alkaline solution to recover the monoester. The monoester is then reacted with thiourea to form the corresponding ester of pseudothiohydantoin-5-acetic acid.

Preferably, in the process according to the invention, approximately stoichiometrical quantities of the monoester of maleic, dimethyl maleic, fumaric, citraconic or mesaconic acid and thiourea are used. While other proportions of the reactants may be used, there is usually no advantage in so doing and purification is rendered more difficult.

The temperature of the reaction may be substantially varied, for example, from 80° to 150° C. Usually to effect substantially complete reaction, the reaction mixture is heated for periods of one hour or longer, as indicated in the examples.

According to the process of the invention, as solvent there may be employed the alcohol used to prepare the monoester of the acid used. However, other alcohols may be used as well as other solvents, e. g., any of the more common solvents, such as benzene, toluene and the like, which dissolve the particular reactants employed.

The new esters of the invention have a variety of uses. They are valuable fungicidal and insecticidal agents. In addition they may be used as organic intermediates, emollients, lubricants and plasticizers.

Although the invention has been described with respect to specific embodiments thereof, it is not intended that the details shall be construed as limitations upon the scope of the invention except to the extent incorporated in the following claims.

What is claimed is:

1. An ester of pseudothiohydantoin-5-acetic acid having the structure:

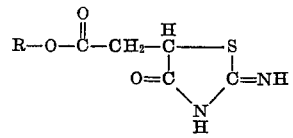

wherein R is a cycloalkyl radical.

2. Cyclohexyl pseudothiohydantoin-5-acetate.

3. A method of preparing esters of pseudothiohydantoin-5-acetic acid which comprises reacting the monoester of an unsaturated aliphatic dicarboxylic acid having the formula $$HOOC-CR_1=CR_2-COOH$$

wherein $R_1$ and $R_2$ are each selected from the group consisting of hydrogen and the methyl radical with thiourea at a temperature of from 80° C. to about 150° C.

4. A method of preparing butyl pseudothiohydantoin-5-acetate which comprises reacting butyl hydrogen maleate with thiourea in the presence of an alkyl alcohol at a temperature of from about 80° C. to about 150° C.

5. A method of preparing cyclohexyl pseudothiohydantoin-5-acetate which comprises reacting cyclohexyl hydrogen maleate with thiourea in the presence of cyclohexanol at a temperature of from about 80° C. to about 150° C.

6. A method of preparing 2-ethylhexyl pseudothiohydantoin-5-acetate which comprises reacting 2-ethylhexyl hydrogen maleate with thiourea in the presence of 2-ethylhexanol at a temperature of from about 80° C. to about 150° C.

References Cited in the file of this patent

Beilstein: Handbuch der Organischen Chemie, vol. 27, p. 348, citing Conrad et al., Annalen 285, p. 203.

Beilstein: Handbuch der Organischen Chemie, vol. 27, p. 349, citing Tambach, Annalen 280, p. 235.